(12) United States Patent
DiPasquo

(10) Patent No.: US 7,721,087 B1
(45) Date of Patent: May 18, 2010

(54) CROSS UI PLATFORM ALERTING OF SECURITY STATUS

(75) Inventor: Daniel DiPasquo, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1090 days.

(21) Appl. No.: 11/388,493

(22) Filed: Mar. 24, 2006

(51) Int. Cl.
*H04L 29/00* (2006.01)

(52) U.S. Cl. .................. 713/157; 380/247; 380/248; 380/249; 380/250

(58) Field of Classification Search ............. 455/1–559, 455/565; 380/247–250; 726/22–25
See application file for complete search history.

(56) References Cited

U.S. PATENT DOCUMENTS

| | | | | |
|---|---|---|---|---|
| 5,245,610 | A * | 9/1993 | Lindell | 370/329 |
| 6,195,546 | B1 * | 2/2001 | Leung et al. | 455/419 |
| 6,292,833 | B1 * | 9/2001 | Liao et al. | 709/229 |
| 6,356,937 | B1 * | 3/2002 | Montville et al. | 709/206 |
| 2003/0224760 | A1 * | 12/2003 | Day | 455/412.1 |
| 2005/0075115 | A1 * | 4/2005 | Corneille et al. | 455/456.3 |

OTHER PUBLICATIONS

Symbian OS, [online] [Retrieved on Jun. 13, 2006]. Retrieved from the Internet <URL: http://en.wikipedia.org/w/index.php?title=Symbian_OS&printable=yes>, pp. 1-7.
Symbian Developer Libray, Messaging Overview, Symbian Ltd., [online] [Retrieved on June 13, 2006] Retrieved from the Internet <URL: http://www.symbian.com/developer/techlib/v70sdocs/doc_source/DevGuides/cpp/Messaging/ MessagingOverview.guide.html#MessagingOverview%2emain>, pp. 1-2.
Symbian Developer Library, Components Overview, Symbian Ltd., [online] [Retrieved on Jun. 13, 2006] Retrieved from the Internet <URL: http://www.symbian.com/developer/techlib/v70sdocs/doc_source/DevGuides/cpp/Messaging/ MessagingGuide/MessagingGuide1/ComponentsOverview.guide.html>, pp. 1-3.

* cited by examiner

*Primary Examiner*—Nasser Moazzami
*Assistant Examiner*—Ghazal Shehni
(74) *Attorney, Agent, or Firm*—Fenwick & West LLP

(57) ABSTRACT

Mobile device user interface techniques are disclosed that can run across multiple platforms. These techniques allow for unobtrusive and intuitive communication with the user of the mobile device. For instance, one particular embodiment of the present invention allows a security product executing on a mobile device to use SMS-like messages to alert the user of the security status of the device, and more generally that security products (e.g., anti-virus, anti-spyware, email scanning, and/or intrusion detection) are actively protecting his/her device. A non-platform-user-interface dependent means of providing such alerts is also provided.

20 Claims, 2 Drawing Sheets

CROSS UI PLATFORM ALERTING OF SECURITY STATUS

FIELD OF THE INVENTION

The invention relates to mobile devices, and more particularly, to providing non-platform specific user interface techniques that enable unobtrusive communication with the users of such devices.

BACKGROUND OF THE INVENTION

Mobile devices (e.g., cell phones, personal digital assistants, and smart phones) are typically configured with a small screen and limited input mechanisms due to their desired form factor and mobility. Such limitations present an inherent challenge for user interface (UI) design of applications running on these devices. This challenge is often overlooked by application developers whom design their applications for larger, less constrained computing systems, such as desktop and laptop computers, which have ample display area.

For instance, applications running on desktop and laptop computing systems can readily communicate with the user with any one of a number of techniques. Pop-up windows, dialog boxes, and alert boxes can all be used to inform the user of activity or status information regarding the application. Such communication techniques are acceptable, because larger computing systems provide ample screen room. In addition, having multiple windows open at a time is common on such computing systems and widely accepted.

In contrast, mobile devices generally do not allow for multiple windows to be visible at once. Thus, options are limited to provisioning a blocking window that requires the user to dismiss it, or to show a temporary message on the screen that disappears after a few seconds. Neither of these options is ideal. For instance, blocking windows tend to be obtrusive in that they are generally unexpected in the context of a mobile device, and can impede or otherwise frustrate the user's interaction with the device (e.g., receiving a blocking window while trying to make or receive a call prohibits use of the device until the window is cleared). Temporary messages can also be obtrusive (particularly on a small display), and may go unnoticed if the user is not looking at the display at notification time. Another solution is to simply not provide such communications to the mobile device users. However, such communication silence (as well as unseen messages) is contrary to developing and maintaining product recognition in the market place.

Furthermore, typical operating systems for mobile devices, such as Symbian OS, present a unique development problem. For instance, Symbian OS is a core mobile operating system, but it ships without a standard user interface API so that it remains maximally flexible for different looks, feels, and usage patterns. As such, device manufacturers (e.g., Nokia, DoCoMo, Fujitsu) and third parties (e.g., UIQ) are responsible for developing the user interface. These user interfaces tend to differ dramatically from device to device, even if they are built upon the same target OS version. As such, developers are usually required to rewrite significant portions of existing code base to support each new user interface version running a particular operating system.

What is needed, therefore, are mobile device user interface techniques that can run across multiple UI platforms. These techniques should allow for acceptable and unobtrusive communication with the user.

SUMMARY OF THE INVENTION

One embodiment of the present invention provides a method for internal messaging on a mobile device. The mobile device has an operating system configured with a messaging architecture for sending messages external to the device. The method includes receiving a message from a local application running on the mobile device, and passing the message through the messaging architecture of the mobile device to a messaging server inbox included in the messaging architecture. The method further includes disallowing the message from being sent to a location external to mobile device, and alerting the user that the message received at the inbox is ready for viewing. The method may further include displaying the message in response to user input, and providing the user with one or more options related to the message. In one particular case, the local application is a security application, and the one or more options related to the message include remedial action options. The operating system can be, for example, a Symbian OS, and the message includes an alert from the application. Disallowing the message from being sent to a location external to the mobile device may include, for example, not offering external messaging as a user choice for the local application and/or not implementing external messaging in a corresponding Concrete Server-side MTM. In another particular case, the mobile device includes a user interface, and the method operates independently of that user interface.

Another embodiment of the present invention provides a machine-readable medium (e.g., one or more compact disks, diskettes, servers, memory sticks, or hard drives) encoded with instructions, that when executed by one or more processors, cause the processor to carry out a process for internal messaging on a mobile device having an operating system configured with a messaging architecture for sending messages external to the device. This process can be, for example, similar to or a variation of the previously described method.

Another embodiment of the present invention provides a system for internal messaging on a mobile device having an operating system configured with a messaging architecture for sending messages external to the device. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
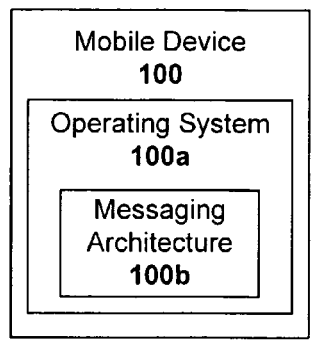
FIG. 1 is a block diagram of an example mobile device configured with an operating system adapted for carrying out internal messaging, in accordance with one embodiment of the present invention.

Mobile device user interface techniques are disclosed that can run across multiple UI platforms. These techniques allow for acceptable and unobtrusive communication with the user. For instance, one particular embodiment of the present invention provides an unobtrusive and intuitive means of alerting a user of a cell phone or smartphone that security products (e.g., anti-virus, anti-spyware, email scanning, and/or intrusion detection) are actively protecting his/her device, and also provides a UI independent means of providing such an alert by exploiting existing operating system (OS) architecture.

Details relevant to the Symbian OS are discussed herein, but implementation details associated with other mobile operating systems will be apparent in light of this disclosure, and the present invention is not intended to be limited to any one particular mobile OS. Furthermore, the disclosed techniques can be applied to a number of mobile devices by various manufacturers, whether running the Symbian OS or some other operating system that can be similarly exploited (e.g., Microsoft Windows Mobile OS, Palm OS, Linux, NOS, and OSE).

General Overview

Symbian OS is a widely used mobile operating system. It is structured like many desktop operating systems, and is capable of multithreading, pre-emptive multitasking, and memory protection. There are a number of smartphone UI platforms based on Symbian OS, including both open platforms (e.g., Nokia's Series 60/80/90 and UIQ) and closed platforms (e.g., such as that developed for NTT DoCoMo's FOMA handsets).

One embodiment of the present invention uses the external messaging stack of the Symbian OS to deliver internal alerts that security products are actively protecting the user's device. In one particular configuration, SMS-like messages (short message service or text messages) are used, and are displayed with the appropriate look on every Symbian platform. Such text messaging is often used to communicate between two or more mobile devices, and is generally perceived as less intrusive relative to pop-up and blocking windows. In addition, users can set OS preferences as to how they wish to be alerted.

The messaging scheme can be further customized to provide additional features and options to the user, such as the option to see more details about a detected security threat, or the option to take a corrective action, or to carry out any functionality that may be needed by the alerting product. Controls can be provisioned that allow utilization of the look and feel of a messaging application (e.g., SMS or other such messaging application), and also allow for application-specific executions (e.g., alerting of security status).

In more detail, the Symbian OS, as part of its core framework, includes a messaging server inbox that is flexible and extendable. However, this messaging server (including its inbox) was created for applications that can send and receive different protocols (e.g., SMS, MMS, POP3 email, fax, etc) as well as file transfer protocols (e.g., OBEX for infrared and Bluetooth, FTP, etc) to other devices (e.g., mobile phones, computers, etc) external to the Symbian device. In accordance with an embodiment of the present invention, the message server's extendible architecture is exploited to provide a new inter-device protocol, by implementing just the server side component, which can receive messages. In addition, the architecture is configured to disallow the ability to send messages through the inter-device protocol to outside the mobile device. Rather than implementing an actual messaging protocol, the Symbian messaging server is used to send messages directly through the mobile device to the inbox. The user is then alerted by the mobile device (e.g., based on the user's custom settings) that he/she has a new message ready for viewing.

System Architecture

FIG. 1 is a block diagram of an example mobile device configured with an operating system adapted for carrying out internal messaging, in accordance with one embodiment of the present invention.

As can be seen, mobile device 100 includes an operating system 100a, which in turn includes a messaging architecture 100b. The mobile device 100 can be, for example, a cell phone or smartphone or personal digital assistant or any other such mobile devices with limited viewing screen space, and that can benefit from a message system as described herein. The operating system 100a is a mobile operating system, and in this particular embodiment is the Symbian OS. Other embodiments can be used in the context of other operating systems having similar messaging architecture that can be modified and exploited as described herein (e.g., Microsoft Windows Mobile OS, Palm OS, Linux, NOS, and OSE). The messaging architecture 100b is discussed in more detail with reference to FIG. 2.

Figure 2:
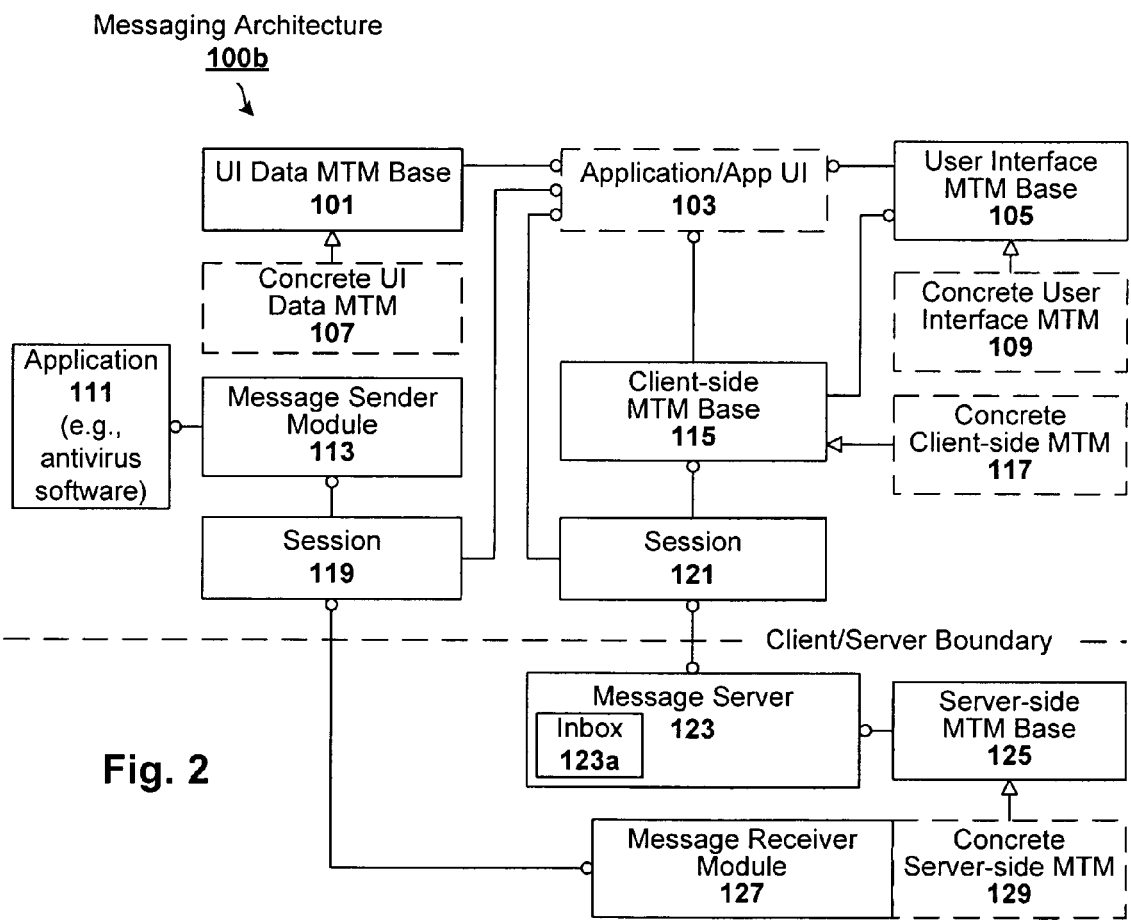
FIG. 2 is a block diagram of a messaging architecture configured for internal messaging on a mobile device, in accordance with one embodiment of the present invention.

FIG. 2 is a block diagram of messaging architecture 100b, which is configured for internal messaging on mobile device 100, in accordance with one embodiment of the present invention. The architecture 100b is depicted using Unified Modeling Language (UML), and is based on the Nokia Series 60 software development kit (SDK), which is herein publicly available from a number of sources and is herein incorporated in its entirety by reference. Dashed boxes indicate components that can be developed by third-parties.

As is known, the Symbian OS has a client-server architecture, which allows applications to exchange data using a robust message-passing system for communicating between two or more devices (e.g., two smartphones, a smartphone and laptop, etc). This message-passing system is designed to minimize use of system resources, and to enable the creation of plug-in modules to support individual messaging protocols. The set of components that make up a plug-in module is called a Message Type Module (MTM). Interaction with lower-level communication protocols, such as TCP/IP, is carried out by MTMs.

The message-passing system also provides base classes, which define the component interfaces for MTM implementations. These base class interfaces allow client applications to discover and dynamically use the available messaging protocols. As known and explained in Symbian OS literature (e.g., Symbian OS v7.0s, which is herein incorporated in its entirety by reference), MTM base classes are sub-classed to provide support for a messaging protocol.

The four base classes are shown in FIG. 2 and include: User Interface MTM Base 105 (provides user interface capabilities, such as viewing and editing messages), Client-side MTM Base 115 (handles the interface between the internal representation of a message's data and the User Interface MTM base 105), UI Data MTM base 101 (provides access to certain UI MTM-specific resources), and Server-side MTM base 125 (provides message transport over the relevant communications protocol). Each base class can be implemented as conventionally done.

Each of the Concrete User Interface MTM 109, Concrete Client-side MTM 117, Concrete UI Data MTM 107, and Concrete Server-side MTM 129 represent instances of MTM components written to implement a particular messaging protocol (e.g., SMS, MMS, POP3 email, fax, etc). The Application/App UI 103 is a custom user interface and represents a message client application. Each of these components/functionalities can also be implemented as conventionally done. However, particular modifications to various components and configuration details of each component will be apparent in light of this disclosure The Message Server 123 can be implemented as a standard server that accepts asynchronous requests from clients via a kernel-maintained session, as is conventionally done. This Message Server 123 includes an inbox 123a for storing message data, and controls access that message data and delegates protocol-specific requests to Server-side MTMs. With regard to controlling access to message data in inbox 123a: in response to client requests, the Message Server 123 delegates temporary, exclusive access to message data. The Message Server 123 maintains the message data in proper order, and handles events such as failure recovery. With regard to delegating requests to Server-side MTMs: the Message Server 123 identifies requests, such as sending a message, that require protocol-specific functionality and load the appropriate Server-side MTM. The Message Server 123 and any loaded Server-side MTMs exist in the same process space. Such a design allows clients to access the combined functionality of the Message Server 123 and the Server-side MTMs through a single server interface. A record of the installed MTMs is held in the MTM Registry. Registry classes allow MTM components to be identified and instantiated.

As is known, sessions allow client-side components to issue requests to the Message Server 123. In the embodiment shown, session 121 is initiated as is conventionally done. In addition, session 119 in the UML diagram shows how the message sender module 113 has an instance of a server/client session that it uses to communicate with the message receiver module 127, as will be explained in turn. There are a number of known classes provided to clients that allow message entries to be manipulated. Note that no lower-level communication components are shown, as the messaging system is designed to be independent of any particular communication protocol. Instead, communications libraries are accessed as needed by Server-side MTMs. For example, an SMTP MTM could use TCP/IP, while an SMS MTM could use the Telephony Server (ETel).

As previously noted, the messaging architecture 100b illustrated in FIG. 2 is based on the Nokia Series 60 SDK. However, the architecture 100b has been modified to include a message sender module 113 and a message receiver module 127, in accordance with this example embodiment of the present invention. These modifications can be also be employed in conjunction with other SDKs, as will be apparent in light of this disclosure, and the present invention is not intended to be limited to any one particular device or SDK.

The message receiver module 127 can be implemented within the Concrete Server-side MTM 129 or can exist as a separate module that is communicatively coupled with the Concrete Server-side MTM 129 (as shown in FIG. 2). In this way, the message receiver module 127 is part of the Concrete Server-side MTM 129 that is implemented to pass messages from application 111 to the Message Server 123. The message sender module 113 can be implemented as a simple interface used by the application 111 to communicate a message to a user. Every application 111 (only one shown) used in conjunction with the messaging architecture 100b will have an instance of the message sender module 113.

The Concrete Server-side MTM 129 implements the Server-Side MTM Base 125, so that the Concrete Server-side MTM 129 is able to pass messages into the Symbian messaging architecture. However, outgoing messaging (to outside device 100) is disabled in the Concrete Server side MTM 129, as will be explained in turn. The Concrete Server-side MTM 129 is instantiated and called from the message receiver module 127. Multiple applications 111 can then become Symbian Message Clients via operation of a corresponding message sender module 113, and send messages to the message receiver module 127.

In one particular embodiment, application 111 is a security application (e.g., Symantec Mobile Security for Symbian OS, or other such mobile security applications). In such a case, the messages can be implemented as SMS messages or other similar custom messages, and can be used to alert of the user of security status. (so that the user knows that their mobile device 100 is being protected by the security application 111). The implementation of the Concrete UI Data MTM 107 can be configured to customize the user interface seen by the user when opening the desired messaging application on a Symbian device, and can be further configured to allow for custom features and options to the user.

For instance, a message may provide the user with an option to see more details about a detected security threat (e.g., using a hyperlink to an informational page about the threat), or an option to take a corrective action (e.g., delete infected filed from mobile device), or to carry out any functionality that may be needed by the alerting product (e.g., update virus definitions or other compliance activity).

Also, controls can be programmed or otherwise provisioned that allow utilization of the look and feel of the messaging application, and to allow for application-specific executions. For instance, the user can designate how messages look, as well as the type of messages sent. In one particular configuration, SMS-like messages are used to inform the user about security alerts, a (e.g., "Symantec Mobile Security has deleted the worm, 'Cabir.A' as it was attempting to infect your phone," or "Symantec Mobile Security has blocked a potential hacker from scanning your phone for open ports"). An alerting user interface can be implemented for each type of mobile device to be supported.

In addition, the architecture 110b is configured to disallow the ability to send messages from application 111 through the inter-device protocol to outside the mobile device 100. In one particular embodiment, this is achieved by disabling outgoing messaging in the Concrete Server side MTM 129 (e.g., by overloading the Messaging Data Class), so as to disallow the ability to send messages through the inter-device protocol to outside the mobile device. Rather than implementing an typical messaging protocol (for sending messages outside the mobile device 100), the message receiver module 127 is used to send messages directly through the mobile device to the inbox 123a of the message server 123. The user is then alerted by the mobile device 100 (e.g., based on the user's custom settings) that he/she has a new message ready for viewing. This alerting mechanism is part of the normal architecture of the Symbian OS and operates in the same manner as if the message had been received from some external device. Standard user interface features can be implemented to allow the user to select or otherwise access the message. The display of the mobile device 100 can be used for visual communications.

As previously explained, the Application/App UI 103 is a custom user interface that is loaded by the Symbian messaging application. It allows types of messages to have a custom user interface with which to both send new messages and display received messages, while allowing for user response. The Application/App UI 103 can also be configured to disable the ability to send a message externally (i.e., for application 111, the user is not given a UI control to send messages outside the mobile device 100). Thus, sending messages outside device 100 can be disallowed in the UI (by not offering it as a user choice) and also by not implementing it in the Concrete Server-side MTM 129. The Application/App UI 103 can also be configured to allow for custom user interaction that can respond back to or otherwise interact with the application 111 using standard inter-process communication. Any number of conventional user interface mechanisms (e.g., stylus or touch screen selectable options, such as "quarantine infected file and upload for further analysis" or "delete infected file—recommended") can be implemented by Application/App UI 103.

In operation, the message receiver module 127 acts as a server that receives communication from the message sender module 113 via the Server/Client session 119. These messages are passed on to the Message Server 123 and stored as part of the Inbox 123a, until they are retrieved via a Client/Server session 121 and displayed in the Application/App UI 103.

Each of the illustrated components can be implemented in software (e.g., C, C++, Java, or other suitable programming language) that executes on a processor of device 100 (e.g., Symbian OS, including its typical components, is an object-oriented software system). However, other embodiments could be implemented, for example, in hardware (such as in gate level logic or ASIC), or firmware (e.g., microcontroller configured with I/O capability for receiving messages from application 111 and a number of routines for implementing a messaging architecture as described herein), or some combination thereof. In addition, note that the modules are shown as separate for purposes of illustration, and that other embodiments may have the various functionalities or sub-sets thereof integrated into a single module. Numerous configurations will be apparent in light of this disclosure.

Methodology

Figure 3:
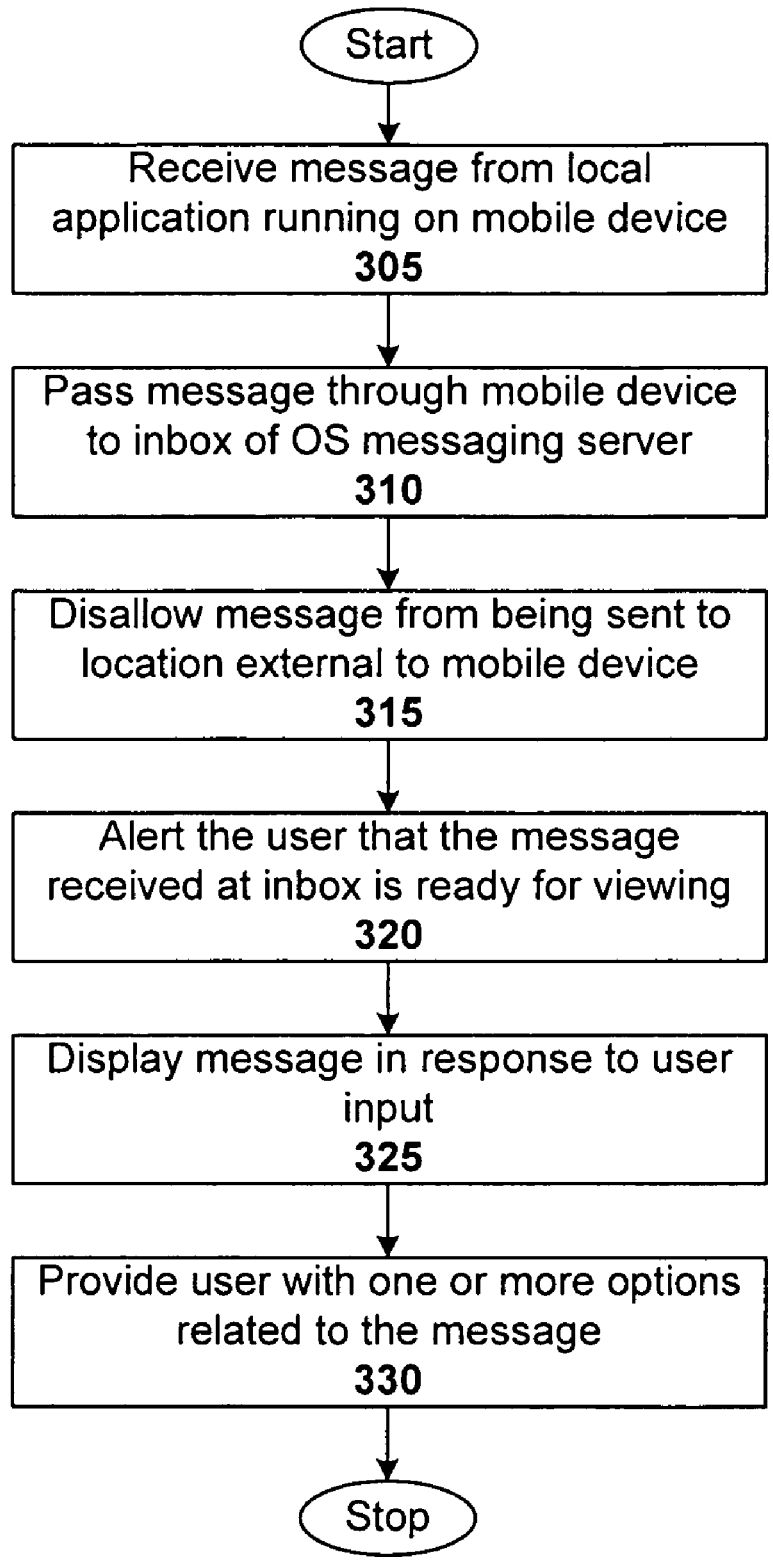
FIG. 3 illustrates a method for internal messaging on a mobile device, in accordance with one embodiment of the present invention.

FIG. 3 illustrates a method for internal messaging on a mobile device, in accordance with one embodiment of the present invention. This method can be carried out, for example, by the messaging architecture described with reference to FIG. 2. As previously explained, these modules can be implemented as executable code encoded on a machine-readable medium, in accordance with one particular embodiment.

The method begins with receiving 305 a message from a local application running on a mobile device that has an operating system configured with a messaging architecture for sending messages external to the mobile device. In one particular embodiment, the local application is a security application. Other local applications can also be used, such as a calendaring application for reminding its user of daily appointments, or any application that can benefit from sending alerts or other such messages to the user.

The method continues with passing 310 the message through messaging architecture of the mobile device to a messaging server inbox of the operating system. This passing can be implemented, for example, where message receiver module 127 acts as a server that receives communication from the message sender module 113 via the Server/Client session 119. The method continues with disallowing 315 the message from being sent to a location external to the mobile device. In one particular embodiment, sending messages external to the mobile device can be disallowed in the UI (by not offering "external messaging" as a user choice for this particular local application that has sent the message), as discussed with reference to Application/App UI 103. Alternatively, or in addition to, sending messages external to the mobile device can be disallowed by not implementing external message sending ability for application, as discussed with reference to the Concrete Server-side MTM 129. It will be appreciated that "external" as used herein is intended to mean outside the mobile device (as opposed to contained within the mobile device).

The method continues with alerting 320 the user that the message received at the inbox is ready for viewing, and then displaying 325 the message in response to user input. The method further includes providing 330 the user with one or more options related to the message. For instance, and as previously explained, the user could be given a choice as to what remedial action is to be taken.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for internal messaging on a mobile device having an operating system configured with an internal messaging architecture for sending messages external to the device, comprising:

receiving a message from a local application running on the mobile device;

passing the message through the internal messaging architecture of the mobile device to a messaging server inbox on the mobile device and included in the internal messaging architecture;

disallowing the message from being sent to a location external to the mobile device; and alerting the user that the message received at the messaging server inbox on the mobile device is ready for viewing.

2. The method of claim 1 further comprising:

displaying the message in response to user input; and providing the user with one or more options related to the message.

3. The method of claim 2 wherein the local application is a security application, and the one or more options related to the message include remedial action options.

4. The method of claim 1 wherein the local application is a security application.

5. The method of claim 1 wherein the operating system is a Symbian OS, and the message includes an alert from the application.

6. The method of claim 1 wherein disallowing the message from being sent to a location external to the mobile device comprises at least one of not offering external messaging as a user choice for the local application and not implementing external messaging in a corresponding Concrete Server-side MTM.

7. The method of claim 1 wherein the mobile device includes a user interface, and the method operates independently of that user interface.

8. A machine-readable medium encoded with instructions, that when executed by one or more processors, cause the processor to carry out a process for internal messaging on a mobile device having an operating system configured with an internal messaging architecture for sending messages external to the device, the process comprising:
   receiving a message from a local application running on the mobile device;
   passing the message through the internal messaging architecture of the mobile device to a messaging server inbox on the mobile device and included in the internal messaging architecture;
   disallowing the message from being sent to a location external to the mobile device; and
   alerting the user that the message received at the messaging server inbox on the mobile device is ready for viewing.

9. The machine-readable medium of claim 8, the process further comprising:
   displaying the message in response to user input; and
   providing the user with one or more options related to the message.

10. The machine-readable medium of claim 9 wherein the local application is a security application, and the one or more options related to the message include remedial action options.

11. The machine-readable medium of claim 8 wherein the local application is a security application.

12. The machine-readable medium of claim 8 wherein the operating system is a Symbian OS, and the message includes an alert from the application.

13. The machine-readable medium of claim 8 wherein disallowing the message from being sent to a location external to the mobile device comprises at least one of not offering external messaging as a user choice for the local application and not implementing external messaging in a corresponding Concrete Server-side MTM.

14. The machine-readable medium of claim 8 wherein the mobile device includes a user interface, and the process operates independently of that user interface.

15. A system for internal messaging on a mobile device having an operating system configured with an internal messaging architecture for sending messages external to the device, comprising:
   a machine-readable storage medium encoded with executable computer program means comprising:
   means for receiving a message from a local application running on the mobile device;
   means for passing the message through the internal messaging architecture of the mobile device to a messaging server inbox on the mobile device and included in the internal messaging architecture;
   means for disallowing the message from being sent to a location external to the mobile device; and
   means for alerting the user that the message received at the messaging server inbox on the mobile device is ready for viewing.

16. The system of claim 15 further comprising:
   a means for displaying the message in response to user input; and
   a means for providing the user with one or more options related to the message.

17. The system of claim 15 wherein the local application is a security application.

18. The system of claim 15 wherein the operating system is a Symbian OS, and the message includes an alert from the application.

19. The system of claim 15 wherein the means for disallowing the message from being sent to a location external to the mobile device includes at least one of a Application UI that does not offer external messaging as a user choice for the local application, and a corresponding Concrete Server-side MTM that does not implement external messaging.

20. The system of claim 15 wherein the mobile device includes a user interface, and the system operates independently of that user interface.

* * * * *